E. J. VALEUR.
STEERING MECHANISM FOR VEHICLES.
APPLICATION FILED JULY 22, 1918. RENEWED AUG. 30, 1920.

1,374,044.

Patented Apr. 5, 1921.
2 SHEETS—SHEET 1.

Inventor
Einar J. Valeur
By Victor J. Evans
Attorney

E. J. VALEUR.
STEERING MECHANISM FOR VEHICLES.
APPLICATION FILED JULY 22, 1918. RENEWED AUG. 30, 1920.
1,374,044.
Patented Apr. 5, 1921.
2 SHEETS—SHEET 2.
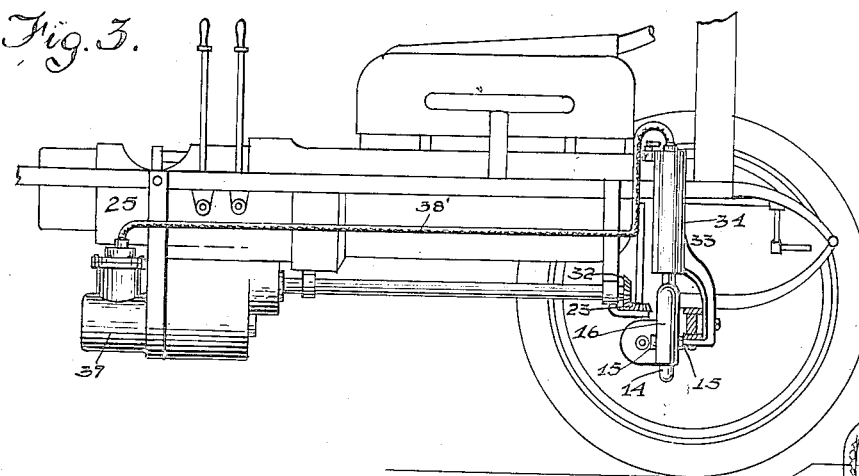
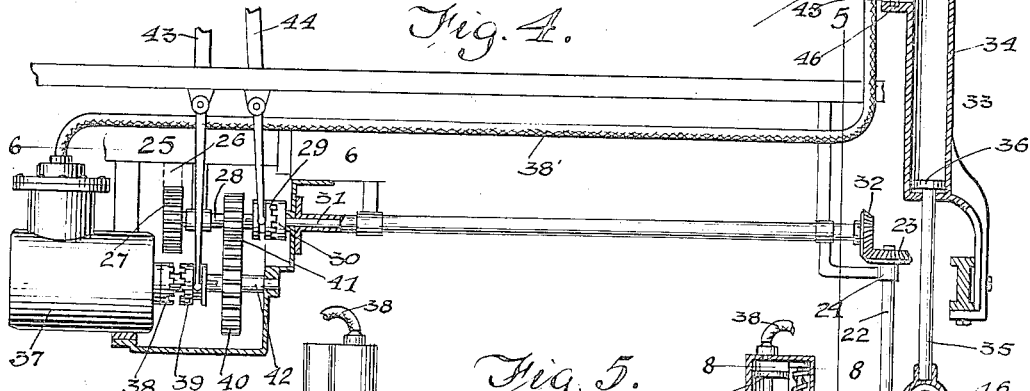
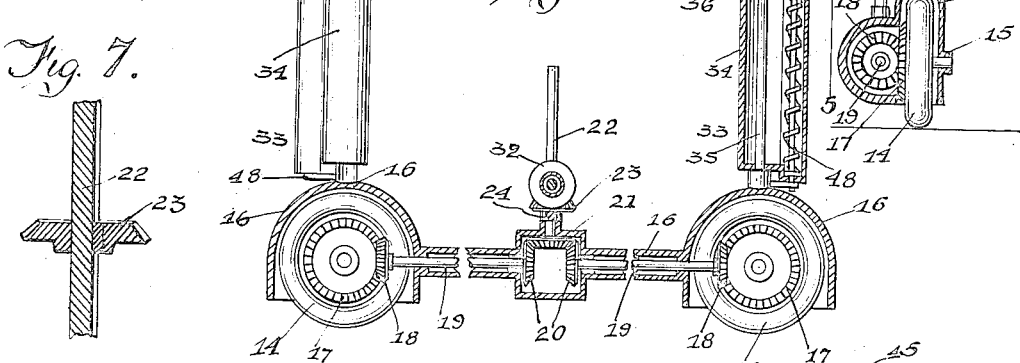
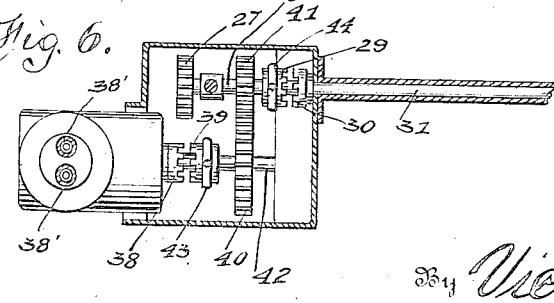
Inventor
Einar J. Valeur
By Victor J. Evans
Attorney

UNITED STATES PATENT OFFICE.

EINAR J. VALEUR, OF NEW YORK, N. Y.

STEERING MECHANISM FOR VEHICLES.

1,374,044. Specification of Letters Patent. Patented Apr. 5, 1921.

Application filed July 22, 1918, Serial No. 246,082. Renewed August 30, 1920. Serial No. 407,065.

*To all whom it may concern:*

Be it known that I, EINAR J. VALEUR, a subject of the King of Denmark, residing at New York, in the county of New York and State of New York, have invented new and useful Improvements in Steering Mechanism for Vehicles, of which the following is a specification.

This invention relates to the general class of vehicles and particularly to steering mechanism therefor.

While my invention is particularly applicable to automobiles and similar wheeled vehicles, I would have it expressly understood that I in no wise wish to limit myself to this specific application or embodiment of the invention which I have selected merely as a basis for illustrating and describing my invention for the purpose of rendering a clear and comprehensible understanding of the scope and novel features thereof.

My invention broadly comprehends the provision or arrangement of steering mechanism adapted to operate from the fore end of the vehicle to permit of a quick and efficacious turning of the vehicle in relatively short and sometimes exceedingly limited spaces such as narrow streets and places where traffic is congested.

One of the essential features of the invention lies in the combination of a steering mechanism to be used in lieu of the regular steering mechanism of a wheeled vehicle and I have provided means whereby the vehicle can be turned by supplying power to the fore end thereof, preferably when the latter is elevated above its normal level and with the rear supporting wheels of the vehicle as an axis around which the vehicle is adapted to be turned. In this manner, the vehicle can be conveniently turned in its own length and in practice it is not necessary to manipulate the power plant in order that the necessary position of the vehicle can be obtained in order to permit of proper turning thereof.

Another important feature of the invention resides in the provision of a normally inactive auxiliary steering mechanism adapted to be used conjointly with a vehicle having a power plant and steering mechanism for the front wheels of the vehicle, combining the auxiliary steering mechanism with means for actively advancing the same for engagement with the roadway and for simultaneously elevating the fore end of the vehicle to bring the fore wheels above the level of the roadway and then supplying power to the auxiliary steering mechanism while the power plant of the vehicle is at rest and thereby permit the vehicle to be operatively turned with the hind wheels as a steering center.

Another feature which I desire to emphasize is the provision of an auxiliary steering mechanism adapted to be used at the will of the operator in lieu of the primary steering mechanism of a wheeled vehicle, providing propelling wheels for said auxiliary mechanism; employing supporting devices for the propelling wheels of the auxiliary mechanism and combining the supporting means with a mechanism which will serve to move the supports and apply the supporting wheels of the auxiliary mechanism in proper contact with the roadway.

Another feature of the invention resides in the provision of a mechanism in which the fore end of the vehicle can be utilized as a jack to hold the front wheels of the vehicle above the level of a supporting surface when the automobile is at rest, such as for instance when the automobile is in storage and then locking the parts while in such position to minimize the stealthy taking away of the vehicle by an unauthorized person.

I shall now proceed to describe one embodiment of the invention with reference to the accompanying drawings, which show the specific application thereof, and then proceed to point out with more particularity the essential elements of novelty in the annexed claims.

Fig. 3 is a side view with parts in section of the auxiliary steering mechanism.

Fig. 4 is a detail view thereof with parts in section and illustrating a lowered position of the propelling and steering wheel.

Fig. 5 is a rear view of the steering and supporting wheels showing parts in section.

Fig. 6 is a plan view of the clutch mechanism and pump.

Fig. 7 is a detail sectional view of one of the power transmitting gears and its co-acting shaft.

Fig. 8 is a section on the line 8—8 of Fig. 5.

Figure 1:
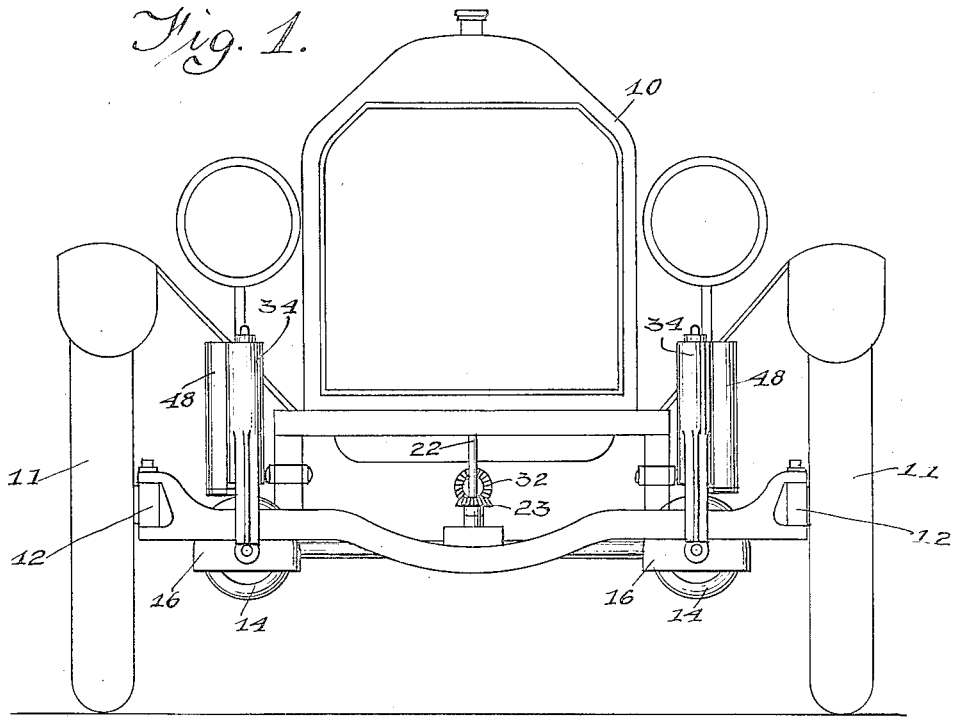
Figure 1 is a front view of a vehicle showing the auxiliary steering and propelling mechanism in its normal resting position.

In carrying the invention into practice, I have made use of an automobile or similar wheeled vehicle 10 which may be of any approved design and construction and obviously provided with a power plant whereby the vehicle can be propelled in the customary manner. The fore wheels 11—11 of the vehicle are mounted on steering knuckles 12 which are also of the usual type and adapted to be controlled through any suitable well known form of steering mechanism in order that during ordinary occasions the vehicle can be properly steered at the will and discretion of the operator.

The mechanism constituting my invention is to be used in cases of emergency where it is necessary to effect a proper steering of the vehicle in narrow roadways or places where traffic is congested and it consists in the provision of steering and propelling wheels 14 each mounted in bearings 15 in a suitable casing 16. Each of these wheels is provided with an annular gear surface 17 arranged in mesh with a gear wheel 18 on a shaft 19. The shafts 19 of the respective steering and supporting wheels 14 are arranged in line with each other and their inner ends are provided with power transmitting gears 20 arranged in mesh with a gear 21 on a shaft 22. Said shaft 22 is provided with a gear wheel 23 operatively mounted in a bracket 24 and keyed to the shaft 22 in order to permit the latter to be raised and lowered respectively for a purpose to be hereinafter fully explained.

The power plant 25 of the vehicle is conventionally illustrated in Figs. 3 and 4 and the same includes a driving gear 26 arranged in mesh with a driven gear 27 on a stub shaft 28. Said stub shaft carries a sliding clutch element 29 adapted to co-act with a fixed clutch element 30 on a power transmitting shaft 31, the latter having a gear wheel 32 meshing with the gear wheel 23 on the sliding shaft 22. It will be appreciated that through this arrangement motion may be taken from the power plant 25 and supplied to the shaft 31 so that the steering and supporting wheels 14 can be revolved.

The casings 16 are supported upon a raising and lowering mechanism 33 which includes air cylinders 34—34 and as shown the casings 16 are equipped with vertically sliding rods 35 having piston heads 36 arranged in the cylinders 34.

These cylinders are operatively connected with an air pump conventionally illustrated at 37 and as shown the air conveying tubes 38' are to open at the upper ends of the said cylinders 34. In this manner it will be seen that when the pump is in operation, air will be supplied to the cylinders where its pressure will be brought against the piston rods 36 to lower the rods 35 and bring the supporting and steering wheels 14 into operative contact with the roadway or surface upon which the vehicle is rested. In so doing the fore end of the vehicle will be elevated approximately to the position shown in Fig. 2 so that the front supporting wheels of the vehicle will be elevated above the plane of the steering and supporting wheels 14. The supporting wheels 14 are arranged preferably in the same horizontal line with each other with their axes at right angles to the axes of the front and rear wheels of the vehicle. The purpose of this arrangement will be better described hereinafter. The pump 37 can be actuated by combining therewith a clutch element 38 and associating with said element a second movable element 39 adapted to be driven by a gear wheel 40 which receives its power through meshing engagement with a gear wheel 41 on the stub shaft 28. The element 39 is keyed upon its supporting shaft 42 in order that it may be adjusted with respect to the element 38. A controlling lever 43 is employed for effecting the necessary adjustments of the clutch element 39 and it is preferred that said controlling lever be arranged in close proximity with a similar lever 44 connected with the sliding clutch element 29.

When it is desired to return the supporting wheels 14 to their normal elevated positions, the air in the cylinders 34 can be bled to the atmosphere by passages 45 which are normally closed by valves 46. These valves have a controlling connection 47 whereby they may be simultaneously opened manually from the driver's seat. When the supporting wheels are elevated, means 48 may be associated with the rods 35 to hold the wheels against descending by gravity.

Figure 2:
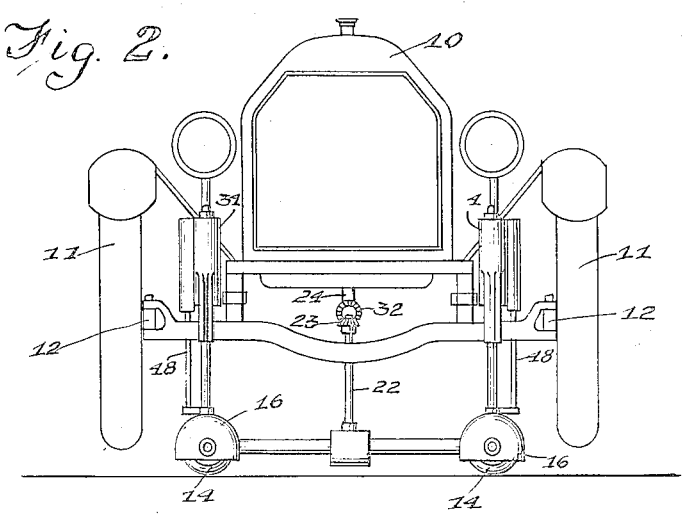
Fig. 2 is a similar view showing the auxiliary steering and propelling mechanism in an active lowered position with the front wheels of the vehicle elevated above their supporting surface.

From the construction described it will be readily understood that when it is desired to turn the car with the rear wheels as a supporting axis, the steering and propelling wheels 14 are lowered so as to raise the front end of the car to bring the wheels 11—11 above the supporting surface as illustrated in Fig. 2. After this is accomplished power is transmitted to the wheels 14 and the car can be satisfactorily turned in short spaces. In addition to the accomplishment of this function the wheels 14—14 can be advantageously used to hold the car against descending when the car is at rest upon inclines such as hilly roadways. The mechanism can also be used in a highly desirable manner for jacking the front end of the car when it is desired to repair the front wheels 11—11. The mechanism can also be used in a satisfactory manner upon armored trucks, cars or the like which are designed for warfare purposes. While I have particularly described the advantages of the invention in connection with vehicles of the type illustrated it obviously follows that its use will be found most suitable for heavy trucks and what are known as commercial cars and in practice, it will eliminate much of the annoyance now caused in a driver's effort to back the car to the position desired.

What is claimed as new is:—

1. A steering mechanism for wheeled vehicles comprising a plurality of pneumatic cylinders carried by the body of the vehicle, pistons movable vertically in said cylinders, a housing carried by the lower end of each of said pistons, a traction wheel mounted in each of said housings, resilient means for normally maintaining the pistons at the top of the cylinders, means connecting said housings and communicating with the interior thereof, and means revoluble in said connecting means and driven by the vehicle motor for imparting rotary motion to the traction wheels.

2. A device of the character described, comprising a pair of housings, a traction wheel revolubly mounted in each of said housings, means rigidly connecting said housings, and maintaining them in spaced relation, an annular gear carried by each of said traction wheels, a bevel gear meshing with each of said annular gears, and adapted to impart rotary motion to the traction wheels, means for driving said bevel gears, and means for simultaneously raising and lowering said housings.

In testimony whereof I affix my signature.

EINAR J. VALEUR.